Nov. 26, 1957  H. I. SOUTHERWICK  2,814,540
PISTON PACKING
Filed July 16, 1956
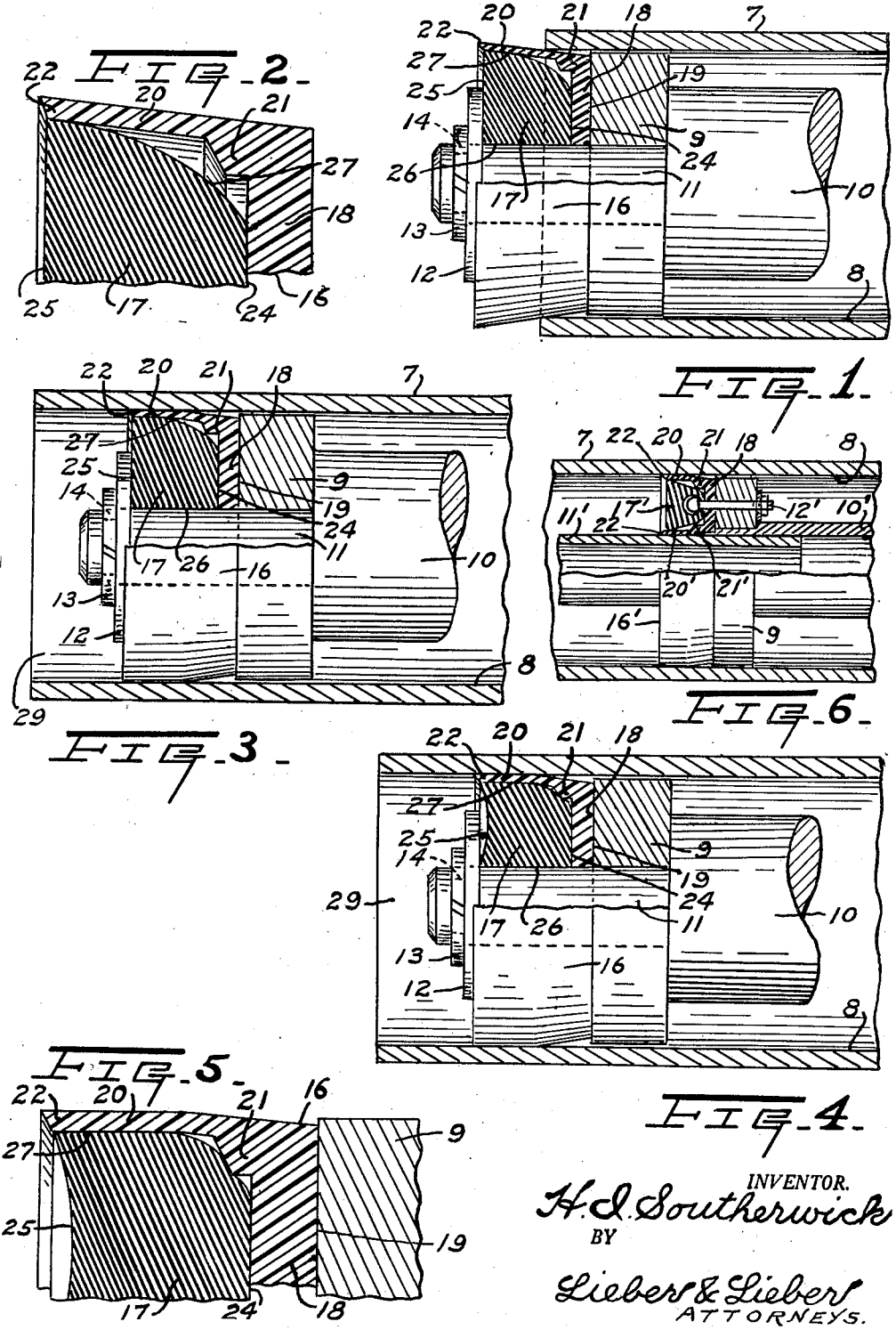
INVENTOR.
H. I. Southerwick
BY
Lieber & Lieber
ATTORNEYS.

United States Patent Office 2,814,540
Patented Nov. 26, 1957

2,814,540

PISTON PACKING

Harold I. Southerwick, Whitefish Bay, Wis., assignor to Blackhawk Mfg. Co., West Allis, Wis., a corporation of Wisconsin Application July 16, 1956, Serial No. 598,128

2 Claims. (Cl. 309—34)

This invention relates in general to improvements in devices for preventing leakage of fluid past coacting relatively movable confining elements, and relates more particularly to improvements in the construction and operation of packings for pistons or the like adapted to be reciprocated within the bores of cylinders and subjected to fluid under pressure.

The principal object of the present invention is to provide an improved piston packing which is durable, and operable with maximum efficiency.

As shown and described in the copending application of Raymond J. Traupmann and Harold I. Southerwick, Serial No. 499,693, filed April 6, 1955, it has heretofore been proposed to provide a reciprocable plunger packing comprising a flexible cup having an inwardly directed supporting wall and an annular flange extending laterally away from the wall periphery and provided at one end with a heel portion of smaller diameter than that of the cylinder bore adjacent the wall and with a bore engaging lip at its opposite end, and a deformable elastic grommet confined within the cup supporting wall and having an end surface coacting with the cup supporting wall and a peripheral surface cooperable with the cup flange to force the lip into engagement with the bore when the grommet is subjected to fluid pressure. The flexible cup is preferably formed of fibrous plastic such as "nylon" while the deformable elastic grommet is composed of solid rubber, and the prior assemblage is such that the heel portion of the cup will always remain out of contact with the cylinder bore even when the packing is subjected to high fluid pressure, by virtue of the fact that the grommet when deformed by such pressure does not contact the interior of the cup heel but only transmits pressure against the cup wall and flange.

While this prior packing assemblage is quite effective in prolonging the life of such cup packings by reducing wear at the heel portions thereof, it has been found that more efficient sealing along the flange of the cup is also possible without introducing inward deflection of the cup lip away from the bore, and still more effective elimination of wear at the cup heel is also possible, by forming the cup flange of less thickness than that of its supporting wall and by thickening the heel portion beyond that of the wall and flange, so that when the grommet is deformed by the application of fluid pressure it will press and maintain the entire relatively thin flexible cup flange in sealing engagement with the cylinder bore and will also firmly press the cup wall into sealing engagement with the piston without causing the cup heel to contact the cylinder bore even when subjected to extremely high fluid pressure.

It is therefore an important object of the present invention to provide an improved cup type piston packing having either L-shape or U-shape cross section, and which is especially adapted to function effectively when subjected to high pressure fluid.

Another important object of this invention is to provide an improved packing assemblage for reciprocable pistons or the like, comprising a flexible flanged sealing ring having a deformable elastic annular member constantly confined therein and cooperable with one or a pair of flanges on the ring to most effectively seal the piston against possible leakage while also prolonging the life of the packing by eliminating excessive wear on the cup flanges.

A further important object of the invention is to provide an improved article of manufacture in the form of a piston packing ring of flexible and resilient relatively hard and wear resistant plastic capable of maintaining its original shape and of effectively resisting permanent distortion due to long usage under severe operating conditions.

Still another important object of the present invention is to provide an improved cup packing having at least one relatively thin annular sealing flange connected with a transverse thicker supporting wall by a still thicker annular heel portion, whereby the annular flange or flanges alone will sealingly engage the adjacent surface or surfaces when the cup interior is subjected to fluid pressure.

These and other more specific objects and advantages of the invention will be apparent from the following detailed description.

A clear conception of the features constituting the present improvement, and of the construction and operation of a typical piston packing assemblage embodying the invention, may be had by referring to the drawing accompanying and forming a part of this specification wherein like reference characters designate the same or similar parts in the various views.

Fig. 1 is a central longitudinal section through a fragment of a cylinder and through a portion of a piston and one of the improved single flange packings, showing the shape of the packing elements before the packing has been completely inserted within the cylinder bore;

Fig. 2 is an enlarged fragmentary section through the same packing assemblage depicting the relative formation and position of the component parts as in Fig. 1;

Fig. 3 is another central longitudinal section through a cylinder and portions of a piston and packing, similar to Fig. 1, with the piston and packing confined within the cylinder bore but before fluid under pressure has been applied;

Fig. 4 is still another central longitudinal section through the cylinder and portions of the same piston and packing, with the piston and packing assemblage confined within the cylinder bore but illustrating the action of the improved packing when subjected to high pressure fluid;

Fig. 5 is an enlarged fragmentary section through the packing assemblage depicting the relative formation and coacting of the sealing components as in Fig. 4; and Fig. 6 is a section similar to that of Fig. 3, but showing the invention incorporated in a double flange cup packing.

While the invention has been shown herein as being advantageously applicable to pistons reciprocable within cylinders and wherein the packing is subjected to pressure liquid such as oil, the improved packings are also susceptible of advantageous use in conjunction with other types of fluid pressure actuated devices embodying relatively movable elements operable by other liquids or gases; and it is also contemplated that specific descriptive terms employed herein be given the broadest possible interpretation consistent with the actual disclosure.

Referring to Figs. 1 to 5 of the drawing, the motion transmitting unit shown therein comprises in general, a cylinder 7 having a bore 8; a piston having a follower 9 secured to a piston rod 10, both movable along and coaxially of the bore 8; and an improved packing assemblage carried by a reduced end portion 11 of the rod 10 adjacent to the follower 9 and being confined upon the piston by an end retainer plate 12 and a snap ring 13 coacting with the plate 12 and with a groove 14 formed in the rod portion 11. The follower 9 may be firmly secured to the rod portion 11 in any suitable manner and has an external diameter only slightly less than that of the cylinder bore 8, and any other satisfactory means for detachably maintaining the packing assemblage upon the rod end portion 11 may be substituted for the plate 12 and snap ring 13.

The improved cup type packing assemblage disclosed in Figs. 1 to 5, inclusive consists of a flexible but rather hard and resilient sealing cup 16 of L-shaped cross section, having a deformable elastic but relatively solid annular member 17 snugly confined therein.

The cup 16 is preferably formed of plastic material such as "nylon" and has an inwardly extending end wall 18 snugly embracing the piston rod portion 11 and likewise engaging the adjacent end surface 19 of the follower 9 while its periphery is of lesser diameter than that of the cylinder bore 8; an annular flange 20 projecting laterally away from the wall 18 and being considerably thinner and therefore more flexible than the latter; and an annular heel portion 21 of greater thickness than that of the wall 18 and flange 20 uniting the wall and flange and also having lesser peripheral diameter than that of the cylinder bore 8. The cup flange 20 is of approximately uniform thickness throughout its length and is biased outwardly receding from the heel portion 21, and the free end of the flange 20 remote from the wall 18 is provided with an annular lip 22.

The elastic deformable annular grommet or member 17 is preferably formed of solid pliable rubber free from confined air and is constantly confined within the cup 16 by the plate 12 and snap ring 13, so that its opposite end surfaces 24, 25 engage the cup wall 18 and the retainer plate 12 respectively, while its central opening 26 snugly embraces the rod end portion 11 and its curved peripheral surface 27 likewise coacts with the internal surface of the cup flange 20. The curvature of the outer grommet surface 27 should be such that when the member 17 is initially inserted within the cup 16, this surface 27 will contact only the cup flange lip 22, as in Figs. 1 and 2, but when the packing assemblage is inserted within the cylinder bore 8 as in Fig. 3 and before fluid pressure is applied, the grommet surface 27 will be somewhat deformed to cause it to contact a substantially greater annular area of the interior of the annular cup flange 20 but not the thickened heel portion 21.

With the various parts of the cylinder, piston and composite packing assemblage constructed and assembled as in Fig. 3, whenever fluid under pressure is applied to the displacement chamber 29 in advance of the piston, the fluid distorts the directly exposed grommet member surface 25 and the body of the member 17 as shown in Figs. 4 and 5, thereby causing the opposite end surface 24 to snugly coact with the adjacent surface of the cup wall 18 and to force this wall against the follower 9, while also spreading the grommet transversely of the piston axis to cause the interior grommet opening 26 to sealingly hug the piston portion 11 and the peripheral surface 27 to likewise hug the internal cup flange surface over an increasing contact area proportional to the fluid pressure within the cylinder. If the applied fluid pressure is sufficient to produce extreme distortion of the grommet member 17, then the curved outer surface 27 thereof may also contact the cup heel portion 21 but the pressure thus applied to this thickened cup portion 21 should never be sufficient to cause the heel of the packing cup 16 to contact the cylinder bore 8.

The improved packing assemblage of Figs. 1 to 5, thus functions to automatically augment the sealing effect, in the manner described, along the flange 20 and at the cup wall 18 as the applied fluid pressure is increased without causing the heel of the cup 16 to contact the bore 8 of the cylinder 7, and when the fluid pressure is released, the resiliency and flexibility of the cup 16 and grommet 17 causes these elements to quickly reassume their normal shape as in Fig. 3. Since the deformation of the grommet 17 by fluid pressure as in Fig. 5 produces proportionally increasing outward pressure against the annular lip 22 of the cup flange 20, this lip cannot curl inwardly as in the prior cup packing assemblages, and the flange 20 therefore wears uniformly throughout its entire length, and this sealing pressure acting upon the lip 22 is augmented as the applied fluid pressure increases.

The improved cup type packing assemblage shown in Fig. 6, consists of a flexible but relatively hard and resilient cup 16' having U-shaped cross-section, and a deformable elastic and relatively solid annular grommet member 17' snugly confined therein. This modified packing is especially adapted to provide similar outer and inner seals between a hollow piston and rod 10', and the interior of a cylinder 7 and the exterior of a fixed tube 11' with which the rod 10' is slidably cooperable.

The cup 16' is also preferably formed of plastic material such as "nylon" and has an end wall 18 snugly engaging the adjacent face of the follower 9 which is firmly attached to the end of the hollow rod 10'. The end wall 18 of the cup 16' has a pair of outer and inner annular relatively thin flexible and resilient flanges 20, 20' respectively formed integral therewith and extending laterally away from this wall, and thick annular heel portions 21, 21' are interposed between the wall 18 and the respective flanges 20, 20'. The cup flanges 20, 20' are of approximately uniform thickness and the flange 20 is resiliently biased outwardly toward the cylinder bore 8 while the flange 20' is likewise biased inwardly toward the periphery of the fixed tube 11'. Each of the annular flanges 20, 20' has a lip 22 at its free end, while the heel portions 21, 21' are constantly spaced from the cylinder bore and from the periphery of the tube 11'.

The elastic deformable grommet member 17' is preferably formed of solid rubber free from confined air, and is constantly confined within the cup 16' between the flanges 20, 20' by bolts 12' which also clamp the wall 18 against the piston follower 9. The outer end portion of this ring member 17' remote from the wall 18 constantly engages both lips 22 of the flanges 20, 20', while the opposite inner end portion of the member 17' is shaped so as to normally avoid contacting the heel portions 21, 21' of the cup 16' before the assemblage is subjected to fluid pressure. However, when the outer face of the grommet member 17' is subjected to pressure, then this member will be deformed as in Figs. 4 and 5 to cause it to simultaneously contact a substantially greater area of the interior of both cup flanges 20, 20', and to thus effect thorough sealing both externally and internally of the hollow piston.

From the foregoing detailed description of the construction and functioning of the two typical improved packing assemblages, it must be apparent that the invention in fact provides a packing unit which is simple and durable in structure, and which is highly efficient in operation especially when subjected to extremely high fluid pressures. The formation of the packing cups 16, 16' with their relatively thick supporting walls 18 and considerably thinner and more flexible flanges 20, 20' of uniform thickness having outwardly biased lips 22, is important in obtaining maximum sealing effect at the surface 19 and along the bore 8 and tube 11', and the provision of the annular thickened heel portions 21, 21' connecting the walls 18 and flanges 20, 20' is also of importance in positively preventing the heels of the cups 16, 16' from contacting the cylinder bore 8 and tube 11'.

The use of relatively hard and resilient plastic such as "nylon" in the formation of the cups 16, 16' not only increases the life of these packing elements by eliminating rapid wear, but also permits the cups to return to their initial shape when relieved of pressure. The relatively thin wall construction of the cup flanges 20, 20' materially reduces the end surface presented to fluid pressure and thus greatly reduces the developed end pressure that tends to crush the sidewalls down toward the heel portion 21, 21'. This reduction in crushing force further reduces to a practical minimum the tendency of the lips 22 to separate from the cylinder 7 and tube 11' when the piston assembly moves under the influence of introduced fluid pressure. The use of a solid deformable member 17, 17' preferably formed of rubber or rubber composition, causes this member to distort under pressure so as to properly distribute the pressure, and to return to normal when the fluid pressure is released. It is, however, desirable to have the elastic grommet members 17, 17' constantly snugly confined within the cup 16, 16' in order to eliminate entrapping of fluid between these elements, and the improved packing has proven highly satisfactory and successful even when operating with thin fluid such as oil and under extremely high pressures.

It should be understood that it is not desired to limit this invention to the exact details of construction and operation of the piston packing herein specifically shown and described, for various modifications within the scope of the appended claims may occur to persons skilled in the art.

I claim:

1. In combination, a cylinder having a bore, a plunger of less diameter than said bore reciprocable within said cylinder, a unitary cup packing having a flat end wall integrally united by a thicker annular heel with one end of a thinner flexible annular flange the opposite free end of which is provided with an annular bore contacting lip, a resilient and distortable solid elastic grommet of thickness measured axially of said plunger substantially equal to the length of said packing flange and having one end clampingly engaging said cup end wall and also having a peripheral surface snugly engaging said thinner cup flange near said lip but normally being spaced from the interior of said thickened heel, and a retainer carried by said plunger and being cooperable with the opposite end of said grommet to clamp the latter against said end cup wall and said wall against the plunger, said cup heel being of less external diameter than said plunger and constantly spaced from said cylinder bore and said grommet being distortable by fluid pressure applied to said retainer engaged grommet end to force the grommet into contact with said heel and to expand said cup lip and the adjacent portion of said flange but not said heel into sealing contact with said cylinder bore.

2. In combination, a cylinder having a bore, a plunger of less diameter than said bore reciprocable within said cylinder, a unitary cup packing having a flat end wall disposed perpendicular to said bore and integrally united by a thicker annular heel with one end of a thinner flexible frustro-conical annular flange the opposite free end of which is provided with an annular bore contacting lip, a resilient and distortable solid rubber grommet of thickness measured axially of said plunger substantially equal to the length of said packing flange and having one end clampingly engaging said cup end wall and also having a peripheral surface snugly engaging said thinner cup flange near said lip but normally being spaced from the interior of said thickened heel, and a retainer secured to said plunger and being cooperable with the opposite end of said grommet to clamp the latter against said end cup wall and said wall against the plunger, said cup heel being of less external diameter than said plunger and constantly spaced from said cylinder bore and said grommet being distortable by fluid pressure applied to said retainer engaged grommet end to force the grommet into contact with said heel and to expand said cup lip and the adjacent portion of said flange but not said heel into sealing contact with said cylinder bore.

References Cited in the file of this patent

UNITED STATES PATENTS

| | | |
|---|---|---|
| 1,955,157 | Wayne | Apr. 17, 1934 |
| 2,658,809 | Schultz | Nov. 10, 1953 |
| 2,666,659 | Audemar | Jan. 19, 1954 |
| 2,701,172 | Koester | Feb. 1, 1955 |
| 2,708,573 | Rovoldt | May 17, 1955 |

FOREIGN PATENTS

| | | |
|---|---|---|
| 544,910 | Great Britain | May 1, 1940 |
| 646,249 | Great Britain | Nov. 15, 1950 |